United States Patent [19]

Richards et al.

[11] Patent Number: 5,384,360
[45] Date of Patent: Jan. 24, 1995

[54] THERMALLY STABLE BLENDS OF PRE-EXTRUDED POLYPHENYLENE ETHER, DIENE BASED RUBBER AND DIALKYLAMINES

[75] Inventors: William D. Richards, Scotia; James E. Pickett, Schenectady, both of N.Y.

[73] Assignee: General Electric Company, Schenectady, N.Y.

[21] Appl. No.: 122,954

[22] Filed: Sep. 20, 1993

Related U.S. Application Data

[63] Continuation-in-part of Ser. No. 850,606, Mar. 13, 1992, abandoned, which is a continuation of Ser. No. 628,811, Dec. 17, 1990, abandoned.

[51] Int. Cl.$^6$ .................. C08L 25/10; C08L 71/12
[52] U.S. Cl. ........................... 525/68; 525/92; 525/132; 525/152; 524/508
[58] Field of Search ............ 525/68, 92, 132, 152; 524/508

[56] References Cited

U.S. PATENT DOCUMENTS

| | | | |
|---|---|---|---|
| 3,994,856 | 11/1976 | Katchman et al. | |
| 4,054,553 | 10/1977 | Olander | 525/132 |
| 4,092,294 | 5/1978 | Bennett, Jr. et al. | 528/215 |
| 4,098,846 | 7/1978 | Olander | 525/132 |
| 4,153,781 | 5/1979 | Thillier et al. | 528/309.1 |
| 4,385,168 | 5/1983 | Ueno et al. | 525/132 |
| 4,788,277 | 12/1988 | Ibe et al. | 525/132 |
| 4,873,286 | 10/1989 | Gallucci et al. | 525/133 |
| 4,892,904 | 1/1990 | Ting | 524/494 |
| 5,001,201 | 3/1991 | Brown | 525/132 |
| 5,102,591 | 4/1992 | Hasson et al. | 525/132 |

FOREIGN PATENT DOCUMENTS 0305861A 3/1989 European Pat. Off. .
0319339A 6/1989 European Pat. Off. .

*Primary Examiner*—James J. Seidleck
*Assistant Examiner*—Thomas Hamilton, III
*Attorney, Agent, or Firm*—William A. Teoli; William H. Pittman

[57] ABSTRACT

There are provided melt extruded blends of polyphenylene ether and diene based rubber containing an effective amount of a dialkylamine which has been found effective as a stabilizer for the diene based rubber. Additional diene based rubber stability can be achieved by using preextruded polyphenylene ether. The resulting melt extruded blends have been found to enjoy increased resistance to change in impact values when recycled in the molded state.

3 Claims, No Drawings

THERMALLY STABLE BLENDS OF PRE-EXTRUDED POLYPHENYLENE ETHER, DIENE BASED RUBBER AND DIALKYLAMINES

REFERENCE TO COPENDING APPLICATIONS

This application is a continuation-in-part of copending application, Ser. No. 07/850,606, filed Mar. 13, 1992 now abandoned which is a continuation of application Ser. No. 07/628,811, filed Dec. 17, 1990 now abandoned. Reference also is made to copending applications, Ser. No. 07/628,809, filed Dec. 17, 1990 now abandoned and Ser. No. 07/628,810, filed Dec. 17, 1990 now abandoned.

BACKGROUND OF THE INVENTION

The present invention relates to blends comprising polyphenylene ether and diene based rubber which exhibit improved resistance to loss of impact strength upon thermal recycling after being molded. More particularly, the present invention relates to blends comprising diene based rubber, polyphenylene ether and an effective amount of a dialkylamine having a boiling point of at least 150° C., such as dioctylamine.

As shown in copending applications Ser. No. 07/628,809 now abandoned and application Ser. No. 07/628,811 now abandoned, the use of metal deactivator/antioxidants, or salicylic acid ester capped polyphenylene ether, along with the prior extrusion of polyphenylene ether for blending with diene based rubber, provided moldable materials which exhibited improved resistance to loss of impact strength after thermal aging or upon thermal recycling after being molded. In view of the environmental concerns of the build-up in land fills of non-biodegradable thermoplastic materials, alternative methods for recycling such thermoplastic materials while minimizing the loss in their useful properties are constantly being sought.

SUMMARY OF THE INVENTION

The present invention is based on the discovery that the thermal stability of diene based rubber subject to thermal aging or thermal recycling, as part of a molded blend with polyphenylene ether, can be substantially improved by the incorporation of an effective amount of a dialkylamine, having the formula,

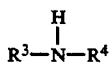

$$R^3-\underset{\underset{H}{|}}{N}-R^4 \qquad (1)$$

where $R^3$ and $R^4$ are selected from $C_{(1-18)}$ organic radicals selected from alkyl radicals, cycloalkyl radicals and alkaryl radicals, where the sum of the total number of carbon atoms in $R^3$ and $R^4$ is sufficient to provide dialkylamines having volatility characteristics allowing for polyphenylene ether extrusion conditions of at least 150° C. or greater.

Until the discovery that dialkylamines were found to be effective stabilizers for diene based rubber in polyphenyleneether blends, it was anticipated only aromatic amines would likely work under such conditions. For example, Jan Pospisil, in Mechanisms of Aromatic Amine Antidegradants, ACS Symposium Series 280 (1985), and Werner Hofmann in Rubber Technology Handbook, Hanser Publishers, Munich (1989), suggest that only aromatic, or strongly discoloring compounds, such as phenylene diamines and phenols are likely to be the most effective as aging protectors for unsaturated rubber.

In certain cases however, unrelated to diene rubber stabilization, alkylamines have been found effective as stabilizers. For example, as shown by U.S. Pat. No. 4,153,781, Thiller et al, certain alkylamines can serve as a blocker for the titanate catalyst in a polyester polymerization reaction.

A possible explanation as to why dialkylamines can perform as stabilizers in diene based rubber, is that the secondary amine forms an imine under melt extrusion conditions which can function as a free radical scavenger.

Based on impact studies shown in copending applications Ser. No. 07/628,809, filed Dec. 17, 1990 now abandoned and Ser. No. 07/628,810, filed Dec. 17, 1990 now abandoned, any improvement in the thermal stability of diene based rubber automatically can be translated into improved resistance to loss of impact upon the thermal recycling or aging of molded blends of such improved diene based rubber with polyphenylene ether. While some improvement is shown when the dialkylamine is simply added to the polyphenylene ether and diene based rubber blend during initial processing, significantly greater advantages have been obtained by either extruding the polyphenylene ether with the dialkylamine prior to blending with the diene based rubber, or when using preextruded polyphenylene ether in combination with the dialkylamine during the melt extrusion with the butadiene based rubber.

STATEMENT OF THE INVENTION

There is provided by the present invention, a polyphenylene ether composition which has enhanced impact strength when initially molded and which resists loss of impact strength upon being thermally recycled at temperatures in the range of 250° C.–350° C., or thermally aged at a temperature of 50° C.–200° C., comprising by weight, from about 5 to about 400 parts of a diene based rubber, per 100 parts of a polyphenylene ether, which blend of polyphenylene ether and diene based rubber is an extrudate of a mixture selected from the class consisting of, (a) a blend of polyphenylene ether, a diene based rubber and about 1 to about 6 parts by weight of a dialkylamine having a boiling point of at least 150° C., per 100 parts of polyphenylene ether, (b) a blend of a diene based rubber, a pre-extruded polyphenylene ether and about 1 to about 6 parts by weight of a dialkylamine having a boiling point of at least 150° C., per 100 parts of polyphenylene ether, and (c) a blend of a diene based rubber and a preextruded mixture of polyphenylene ether and about 1 to about 6 parts by weight of a dialkylamine having a boiling point of at least 150° C., per 100 parts of polyphenylene ether.

The polyphenylene ethers which are employed in the practice of the present invention are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula,

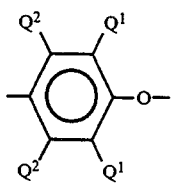

(2)

where in each of said units, each $Q^1$ is a primary or secondary lower alkyl (i.e., alkyl containing up to 7 carbon atoms), phenyl or hydrocarbonoxy and each $Q^2$ is independently hydrogen, halogen, primary or secondary lower alkyl, phenyl or hydrocarbonoxy as defined by $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are included. Suitable homopolymers are those containing, for example, 2,6-dimethyl-1,4-phenylene ether units.

The polyphenylene ethers can have a number average molecular weight within the range of about 3,000–40,000 and a weight average molecular weight within the range of about 20,000–80,000, as determined by gel permeation chromatography. Their intrinsic viscosities are most often in the range of about 0.2–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874; 3,306,875; 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are also known in the art.

Particularly useful polyphenylene ethers are those which comprise molecules having at least one of the end groups of the formulas

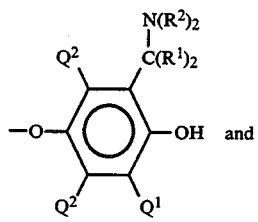

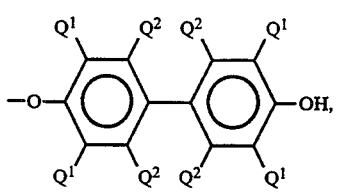

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C^{1-6}$ primary alkyl radical. Preferably, each $R^1$ is hydrogen and each $R^2$ is alkyl, especially methyl or n-butyl.

Polymers containing the aminoalkyl-substituted end groups of formula 3 may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

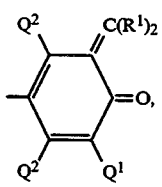

with numerous beneficial effects often including an increase in impact strength and compatibilization with other blend components, Reference is made to U.S. Pat. Nos. 4,054,553; 4,092,294; 4,477,649; 4,477,651 and 4,517,341, the disclosures of which are incorporated by reference herein.

Polymers with 4-hydroxybiphenyl end groups of formula (4) are typically obtained from reaction mixtures in which a by-product diphenoquinone of the formula,

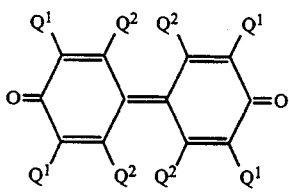

(6)

in present, especially in a copper-halide-secondary or tertiary amine system. In this regard, the disclosure of U.S. Pat. No. 4,477,649 is again pertinent as are those of U.S. Pat. No.4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas 3 and 4. It should be understood however, that other end groups may be present and that the invention in its broadest sense may not be dependent on the molecular structures of the polyphenylene ether end groups.

The term "diene based rubber", as used hereinafter, means rubber having unsaturated double bonds and includes, for example, butadiene based rubber which is preferred, and isoprene based rubber.

Diene based rubber impact modifiers for polyphenylene ether compositions are well known in the art. They are typically derived from one or more monomers selected from the group consisting of olefins, vinyl aromatic monomers, acrylic and alkylacrylic acids and their ester derivatives in combination with conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

In combination with diene based rubber there can be used polyolefins or olefin-based copolymers employable in the invention include poly(1-butene), poly(4-methyl-1-pentene), propylene-ethylene copolymers and the like.

A particularly useful class of impact modifiers are those derived from the vinyl aromatic monomers. These include, for example, modified polystyrenes, ABS type graft copolymers, AB and ABA type block and radial block copolymers and vinyl aromatic conjugated diene core-shell graft copolymers. Modified polystyrenes include rubber modified polystyrenes, such as butadiene rubber-modified polystyrene (otherwise referred to as high impact polystyrene or HIPS). Additional useful polystyrenes include copolymers of styrene and various monomers, including, for example, poly(styrene-acrylonitrile) (SAN), styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

An especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers are polystyrene-polybutadiene (SBR), polystyrene-polyisoprene and poly(alpha-methylstyrene)-polybutadiene. Such AB block copolymers are available commercially from a number of sources, including Phillips Petroleum under the trademark SOLPRENE.

Examples of triblock copolymers include polystyrene-polybutadiene-polystyrene (SBS), polystyrene-polyisoprene-polystyrene (SIS), poly(α-methylstyrene)-polybutadiene-poly-(α-methylstyrene) and poly(α-methylstyrene)-polyisoprene-poly-(α-methylstyrene). Particularly preferred triblock copolymers are available commercially as CARIFLEX®, and KRATON D® from Shell. Reference also is made to Kambour, U.S. Pat. No. 3,639,508 which is incorporated herein by reference.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core and one or more shells polymerized thereon and derived from monoalkenylarene and/or acrylic monomers alone or, preferably, in combination with other vinyl monomers.

The preferred impact modifiers are block (typically diblock, triblock or radial teleblock) copolymers of alkenylaromatic compounds and dienes or a mixture of dienes and olefins. Most often, at least one block is derived from styrene and at least one other block from at least one of butadiene, or isoprene. Especially preferred are the triblock copolymers with polystyrene end blocks and diene-derived midblocks. The weight average molecular weights of the impact modifiers are typically in the range of about 50,000–300,000. Block copolymers of this type are commercially available from Shell Chemical Company under the trademark KRATON, and include KRATON D1101, and D1102.

There are included within the dialkylamines of formula 1, dibutylamine, dioctylamine, dihexylamine, dioctadecylamine, methyloctadecylamine, methyldodecylamine, dicyclohexylamine, n-butylbenzylamine and dibenzylamine The thermally stable blends of polyphenylene ether and diene based rubber can be made by melt blending, and preferably melt extruding, the ingredients at temperatures of from 250° C. to 350° C. The resulting blend can be pelletized and thereafter blended with an organic polymeric matrix material, such as a polyamide, polystyrene, a polyetherimide, or a polyester, for example, polyalkyleneterephthalate and preferably polybutyleneterephthalate. Dry blending followed by melt extrusion at the aforementioned melt extrusion temperatures also will provide effective results. Additional procedures can include "down stream feeding" where the matrix material and/or the diene based rubber can be added to the extruder following the earlier melt extrusion of the polyphenylene ether.

A proportion of from 60 to 200 parts of the matrix material, per 100 parts of the polyphenylene ether will provide effective results.

Polyamides suitable as matrix material in the preparation of the compositions of this invention may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. Particular examples of aminocarboxylic acids and lactams are ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

H$_2$N(CH$_2$)$_n$NH$_2$ wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

HOOC—Y—COOH wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

In addition to polyamides, other matrix material which can be used are polystyrene and polyesters, such as polyalkyleneterephthalates and preferably polybutyleneterephthalate. In addition, polyetherimides are included which are shown by Heath et al, U.S. Pat. No. 3,847,867 incorporated herein by reference.

Polyesters which can be used as matrix material, generally have number average molecular weights in the range of about 20,000–70,000, as determined by intrinsic viscosity (IV) at 30° C. in a mixture of 60% (by weight) phenol and 40% 1,1,2,2-tetrachloroethane. When resistance to heat distortion is an important factor the polyester molecular weight should be relatively high, typically above about 40,000.

The polyesters are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. Poly(ethylene terephthalate) and poly(butylene terephthalate), and especially the latter are preferred.

In order that those skilled in the art will be better able to practice the present invention, the following examples are given by way of illustration and not by way of limitation. All parts are by weight.

EXAMPLE

Blends of poly(2,6-dimethyl-1,4-phenylene ether) having an intrinsic viscosity of about 0.4 dl/g in chloroform at 25° C. and a styrene butadiene styrene block copolymer (Kraton KD1102 manufactured by the Shell Chemical Company) were prepared using a 20 mm Welding Engineers twin screw extruder at a set temperature of 295° C. and a screw speed of 400 rpm. The weight ratio of 80/20 of the polyphenylene ether to the SBS block copolymer was used for all of the blends. Commercial stabilizers were added to some of the blends to determine their effect on the thermal stability of the butadiene rubber. The blends were prepared by two different methods. One method involved extruding simultaneously the polyphenylene ether, the SBS block copolymer and additives. In another method, the polyphenylene ether was first extruded and then reextruded with the SBS. In instances where dioctylamine was used it was employed at a level of either 1% or 2% by weight, based on the weight of the blend. After extrusion, all the blends were compression molded into bars for testing. Two different molding procedures were used to simulate mild and severe thermal histories. For a mild thermal history, the samples were heated to 240° C. and held for 1 minute prior to quenching. Quenching was done by placing the sample between steel plates in a molding press at a temperature of about 20° C. For the severe thermal history, the samples were heated to 300° C. and held for 20 minutes prior to quenching.

Thermal stability was determined using dynamic mechanical analysis (DMA) to measure the temperature of the loss peak associated with the glass transition temperature of the rubber. Glass transition temperature of the rubber increases with increasing crosslink density. In order to be effective, the impact modifier must have a glass transition temperature that is well below the temperature at which impact occurs. The following results were obtained, where PPE is polyphenylene ether, and the components in square brackets were extruded prior to being blended with KD 1102, impact modifier:

| Blends | Rubber Transitions (°C.) | |
|---|---|---|
| | Mild Processing 1 min at 240° C. | Severe Processing 20 min at 300° C. |
| 1. KD1102 | −80 | −54 |
| 2. PPE/KD1102 | −62 to −51 | 15 to 45 |
| 3. PPE/KD1102/Seenox 412S(1%)/Ultranox 257 (1%)[a] | −61 | 5 |
| 4. PPE/KD1102/Dioctylamine (1%) | −62 | 13 |
| 5. PPE/KD1102/Dioctylamine (2%) | −67 | −5 |
| 6. [PPE]/KD1102 | −81 to −71 | −27 to 2 |
| 7. [PPE]/KD1102/Dioctylamine (1%) | −81 | −55 |
| 8. [PPE/Seenox 412S(1%)/Ultranox 257(1%)]/KD1102 | −80 | −33, −42 |
| 9. [PPE/Dioctylamine (2%)]/KD1102 | −84 | −46 |

[a]Seenox 412S is supplied by Argus Chemical Co. Ultranox 257 is supplied by GE Specialty Chemicals.

The above results show that the stability of the SBS is much worse in polyphenylene ether blends than when the SBS is processed alone. One possible explanation is that there are components in the polyphenylene ether resin which catalyze the polybutadiene crosslinking reaction. The addition of a stabilizer consisting of a hindered phenol (Ultranox 257 provided by GE Speciality Chemicals and Seenox 412S a thioester found to have synergistic effects when used with hindered phenols), provide some improvement in rubber stability. However, the Tg of the rubber still increases sufficiently during processing to eliminate this blend as material which can be satisfactorily recycled during high thermal conditions. The addition of dioctylamine at 1% provides a rubber stability substantially equivalent to the use of conventional stabilizers, while further improvement is shown using dioctylamine at a 2% weight level.

Further improvements in polybutadiene stability can be achieved by using extruded polyphenylene ether resin which is shown by polyphenylene ether in the square brackets. The addition of 1% or 2% by weight of dioctylamine in combination with the preextruded polyphenylene ether reduces the polybutadiene Tg to a value substantially equivalent to the polybutadiene when processed alone. A possible explanation is that the dioctylamine is effectively neutralizing the components in the polyphenylene ether resin that are responsible for accelerating the polybutadiene crosslinking reaction. These results show that enhanced resistance to loss in impact upon thermal recycling of molded blends of such polyphenylene ether, KD1102, and dioctylamine can be predicted.

Although the above results are directed to only a few of the very many variables which can be utilized in the practice of the present invention, it should be understood that the present invention is directed to a much broader variety of polyphenylene ethers, diene based rubbers and dialkylamines as set forth in the description preceding this example.

What is claimed is:

1. A polyphenylene ether composition which has enhanced impact strength when initially molded and which resists loss of impact strength upon being thermally recycled at temperatures in the range of 250° C.–350° C., or thermally aged at a temperature of 50° C.–200° C., consisting essentially of by weight, from about 5 to about 400 parts of a diene based rubber, per 100 parts of a polyphenylene ether, which blend of polyphenylene ether and diene based rubber is an extrudate of a mixture selected from the class consisting of, (b) a blend of a diene based rubber, a pre-extruded polyphenylene ether and about 1 to about 6 parts by weight of a dialkylamine having a boiling point of at least 150° C., per 100 parts of polyphenylene ether, and (c) a blend of a diene based rubber and a preextruded mixture of polyphenylene ether and about 1 to about 6 parts by weight of a dialkylamine having a boiling point of at least 150° C., per 100 parts of polyphenylene ether.

2. A polyphenylene ether composition in accordance with claim 1, where the polyphenylene ether is poly(2,6-dimethyl-1,4-phenylene ether).

3. A polyphenylene ether composition in accordance with claim 1, which is an extrudate of a styrene-butadiene-styrene copolymer, a polyphenylene ether and dioctylamine.

* * * * *